US012620762B2

(12) United States Patent
Kannan et al.

(10) Patent No.: US 12,620,762 B2
(45) Date of Patent: May 5, 2026

(54) REPLICATED CABLE CONNECTION PANEL FOR DEVICE REPLACEMENT

(71) Applicant: Dell Products L.P., Round Rock, TX (US)

(72) Inventors: Elayarajan Kannan, Chennai (IN); Ming Chung Chow, Pleasanton, CA (US)

(73) Assignee: Dell Products L.P., Round Rock, TX (US)

( * ) Notice: Subject to any disclaimer, the term of this patent is extended or adjusted under 35 U.S.C. 154(b) by 385 days.

(21) Appl. No.: 18/326,331

(22) Filed: May 31, 2023

(65) Prior Publication Data

US 2024/0405494 A1 Dec. 5, 2024

(51) Int. Cl.
*H01R 43/26* (2006.01)
*H01R 25/00* (2006.01)

(52) U.S. Cl.
CPC ........... *H01R 43/26* (2013.01); *H01R 25/006* (2013.01)

(58) Field of Classification Search
CPC .............................. H01R 43/26; H01R 25/006
USPC ........................................................ 439/491
See application file for complete search history.

(56) References Cited

U.S. PATENT DOCUMENTS 5,821,510 A * 10/1998 Cohen .................. G02B 6/3831 235/375
6,139,356 A * 10/2000 Daoud ................. H01R 9/2683 439/491
6,234,829 B1 * 5/2001 Thomsen ........... H01R 12/7005 439/491
6,688,910 B1 * 2/2004 Macauley .............. H04Q 1/136 379/326
6,784,802 B1 * 8/2004 Stanescu .......... G06K 19/07758 340/687
8,181,229 B2 * 5/2012 Macauley .............. H04Q 1/138 370/363
8,419,465 B2 * 4/2013 Jacks .................. H04L 43/0811 439/491
8,643,476 B2 * 2/2014 Pinn ....................... H04Q 1/136 340/687
2009/0298323 A1 * 12/2009 Patchett ............... H01R 13/465 439/491
2012/0000977 A1 * 1/2012 German ................. H04Q 1/136 235/375
2015/0303607 A1 * 10/2015 Cullins .................. H01R 43/26 29/407.01

(Continued)

OTHER PUBLICATIONS

Dell Technologies, "Dell PowerSwitch S5200-ON Series Switches," Specification Sheet, v2.1, Jan. 2023, 6 pages.

(Continued)

*Primary Examiner* — Gary F Paumen
(74) *Attorney, Agent, or Firm* — Ryan, Mason & Lewis, LLP

(57) ABSTRACT

An apparatus comprises at least one replicated cable connection panel structure configured to replicate a cable connection panel of a device. The apparatus further comprises a set of connection structures mounted on the at least one replicated cable connection panel structure, wherein the set of connection structures replicate a set of connectors of the device, wherein each of the set of connection structures is configured to accommodate a cable that is pluggable into a corresponding one of the set of connectors of the device.

20 Claims, 3 Drawing Sheets

(56) References Cited

U.S. PATENT DOCUMENTS

2015/0349450 A1* 12/2015 Omari ................ H01R 13/6456
439/491

OTHER PUBLICATIONS

Dell Technologies, “Dell EMC PowerSwitch N3200-ON Series Switches,” Specification Sheet, v1.7, Jul. 2021, 7 pages.
Dell EMC, “Dell EMC PowerSwitch S5200-ON Series BMC User Guide,” Rev. A03, Mar. 2021, 41 pages.
Dell Technologies, “Dell Networking N-Series N1108EP-ON, N1500, N2200-ON, and N3200-ON Switches,” User’s Configuration Guide, Version 6.8.0, Rev.A12, Jul. 2022, 1742 pages.

* cited by examiner

REPLICATED CABLE CONNECTION PANEL FOR DEVICE REPLACEMENT

FIELD

The field relates generally to cable management in information processing systems.

BACKGROUND

Information processing systems may include various hardware and software components that may be configured to process, store, and communicate information, and may include one or more computer systems, data storage systems, and networking systems. Switch and other networking devices, for example, may be connected to many other computing devices (e.g., server devices, other switch or networking devices, storage systems, etc.) in a data center via cabling to facilitate transmission of data between such devices. In large data centers with many such devices, cable management and determining connectivity between devices are difficult tasks.

SUMMARY

Illustrative embodiments comprise one or more replicated cable connection panels for managing cables used to couple a first device to one or more other devices in an information processing system when the first device is being replaced.

For example, in one embodiment, an apparatus comprises at least one replicated cable connection panel structure configured to replicate a cable connection panel of a device. The apparatus further comprises a set of connection structures mounted on the at least one replicated cable connection panel structure, wherein the set of connection structures replicate a set of connectors of the device, and wherein each of the set of connection structures is configured to accommodate a cable that is pluggable into a corresponding one of the set of connectors of the device.

In another embodiment, an apparatus comprises a set of replicated cable connection panel structures configured to replicate a cable connection panel of a device. The apparatus further comprises: a first set of connection structures mounted on a first one of the set of replicated cable connection panel structures configured to replicate a first subset of a set of connectors of the device; and a second set of connection structures mounted on a second one of the set of replicated cable connection panel structures configured to replicate a second subset of the set of connectors of the device.

In a further embodiment, a method comprises obtaining at least one replicated cable connection panel configured to replicate a cable connection panel of a device, wherein: (i) the at least one replicated cable connection panel comprises a set of connection structures mounted on the at least one replicated cable connection panel; (ii) the set of connection structures replicate a set of connectors of the device and are correspondingly labeled; and (iii) the set of connection structures are configured to accommodate cables that are plugged into the set of connectors of the device. The method comprises unplugging a given cable from the set of connectors of the device, plugging the given cable into a correspondingly labeled connection structure of the set of connection structures, and repeating the unplugging and plugging steps for each cable, one by one, until the cables previously plugged into the set of connectors of the device are plugged into the set of connection structures of the at least one replicated cable connection panel. The device may then be swapped with a replacement device, and the cable unplugging and plugging steps reversed.

While not limited to any particular use case, illustrative embodiments are particularly well suited for use in the field, i.e., wherein device replacement is being performed within the operational environment of the device (e.g., at a customer site or location such as a data center or other information processing system environment).

These and other illustrative embodiments include, without limitation, methods, apparatus, networks, and systems.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
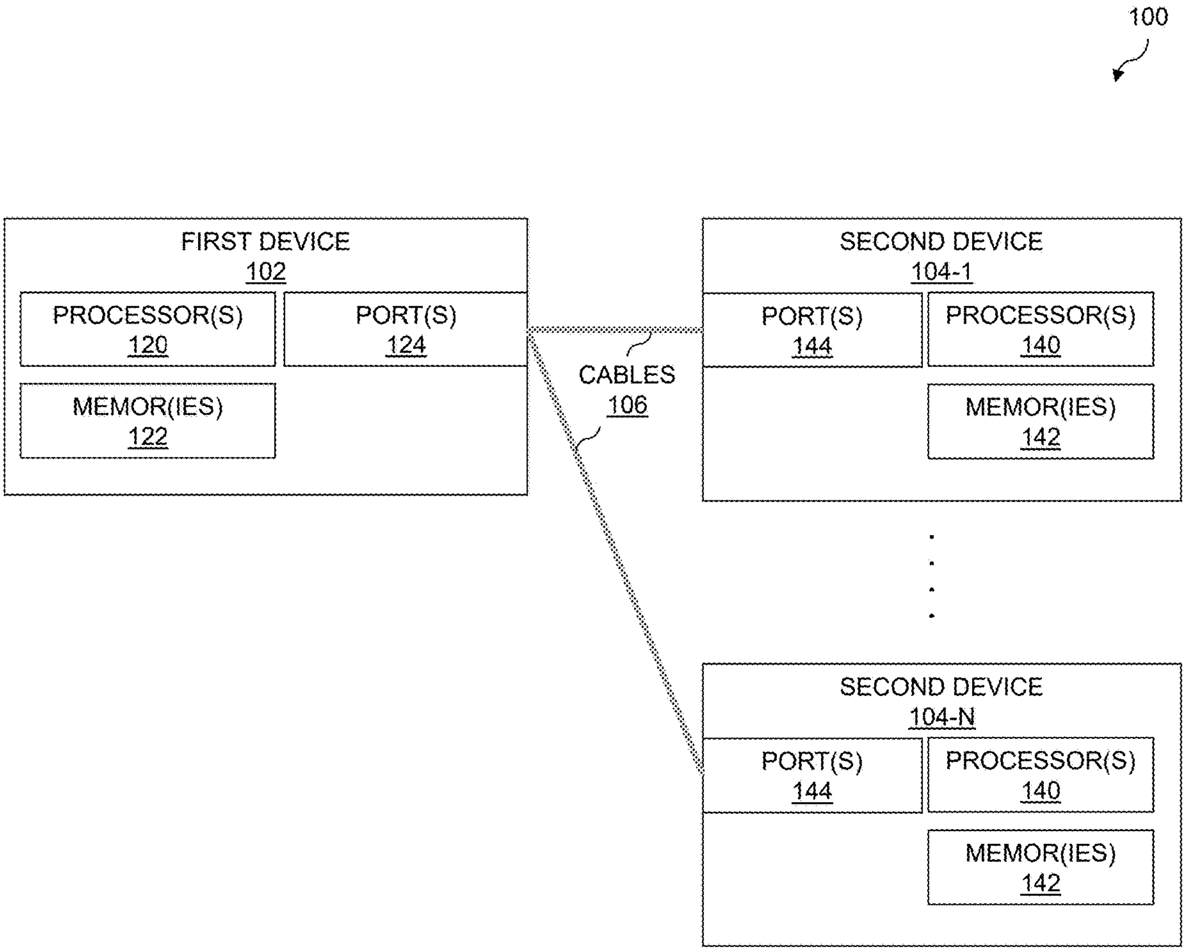
FIG. 1 depicts an information processing system with which one or more illustrative embodiments can be implemented.

Information processing systems may include switches or other network devices that connect multiple computing devices (e.g., server devices, other switch or network devices, storage systems, etc.) via cabling (e.g., one or more cables). The cabling provides for transmission of data between such devices. By way of example only, FIG. 1 depicts at least part of an information processing system 100 with a first device 102 coupled to a plurality of second devices 104-1, . . . , 104-N (hereinafter collectively referred to as second devices 104 and individually as second device 104) via a set of cables 106. The first device 102 comprises one or more processors 120, one or more memories 122, one or more ports 124, while each second device 104 comprises one or more processors 140, one or more memories 142, one or more ports 144. The ports 124 and 144 each comprise a connector (not expressly shown) that is configured to mate to a corresponding connector on one end of one of cables 106.

Depending on the functions of first device 102 and second devices 104, connectors that are part of ports 124, ports 144, and cables 106 have different form factors. By way of example only, one or more of first device 102 and second devices 104 can be a network switch or some other network device with pluggable optical cables (optics) that are configured to transmit and receive various data signals as well as control signals. Thus, ports 124, ports 144, and cables 106 include connectors that enable plugging of a cable into each port as needed to connect first device 102 with one or more of second devices 104. Various form formats for these connectors can include, but are not limited to, Small Form-Factor Pluggable (SFP), enhanced Small Form-Factor Pluggable (SFP+), Quad Small Form-Factor Pluggable (QSFP), enhanced Quad Small Form-Factor Pluggable (QSFP+), Quad Small Form-Factor Pluggable 28 (QSFP28), Quad Small Form-Factor Pluggable Double Density (QSFP-DD), etc. Other fiber optic connector types can include, but are not limited to, industry standards such as straight tip (ST) connector, fiber channel (FC) connector, standard connector (SC), multi-termination unibody (MU) connector, mechanical transfer registered jack (MT-RJ), multifiber push on/multifiber termination push-on (MPO/MTP) connector, etc. Alternatively, the connectors that are part of first device 102 and/or second devices 104 can comprise any form of connector including, but not limited to, connectors configured for Universal Serial Bus (USB), High-Definition Multimedia Interface (HDMI), Digital Visual Interface (DVI), Video Graphics Array (VGA) and/or any other industry standard and/or custom electrical and/or mechanical connectivity configurations.

While not intended to be limiting to any illustrative embodiments, processors 120, 140 may comprise one or more microprocessors, microcontrollers, application-specific integrated circuits (ASICs), field-programmable gate arrays (FPGAs), central processing units (CPUs), graphical processing units (GPUs), tensor processing units (TPUs), video processing units (VPUs), network processing units (NPUs), complex programmable logic devices (CPLDs) or other types of processing circuitry, as well as portions or combinations of such circuitry elements. Memories 122, 142 may comprise random access memory (RAM), read-only memory (ROM), flash memory or other types of memory, in any combination. As such, ports 124, ports 144, and cables 106 may comprise connectors that are configured to accommodate data and control signals that effectuate communications between processors 120 and 140, as well as between memories 122 and 142.

It is realized herein that, in large data centers, the number of cables required for connecting devices, such as cables 106 connecting first device 102 and second devices 104, can make it difficult to manage replacement of a device. For example, in the context of information processing systems comprising network switches and other network components, it is sometimes necessary for a network component provider to perform a switch replacement in the field (e.g., at a customer site or some other remote location) due to different failure symptoms. Most customers have multiple cables connected to each switch deployed in a rack. During replacement, a field engineer, customer, or some other person needs to mark or tag a port number on each individual cable against the connected port before disconnecting the cable from the switch (e.g., first device 102). The field engineer needs to be careful when reconnecting the cables to the appropriate ports of the replacement switch (e.g., a new switch replacing first device 102). If a wrong connection occurs, the field engineer needs to recheck and correct the connection. This requires a field engineer and is time consuming.

To overcome the above and other drawbacks, illustrative embodiments provide one or more replicated (i.e., dummy, artificial, imitation, mock, etc.) cable connection panels for managing cables used to couple a device to one or more other devices in an information processing system when the device is being replaced.

For example, in some embodiments, one cable connection panel can be used to replicate the connection panel of the device being replaced, while in other embodiments, multiple cable connection panels (two or more) can be used to replicate the cable connection panel of the device being replaced. By way of example only, a replicated cable connection panel kit can contain two panels, e.g., a first panel that replicates all the ports for a first set of ports on the device being replaced, and a second panel that replicates all the port connections for a second set of ports on the device being replaced. Advantageously, all ports on the replicated cable connection panels have the same form factor (e.g., QSFP, QSFP+, etc.) as the device being replaced. In some embodiments, the replicated ports can comprise the same type of mating connector that is on the cable connection panel of the device being replaced such that the cable is plugged into the port of the replicated cable connection panel the same way it would be plugged into the actual device. However, in other embodiments, the replicated ports can simply have a corresponding mechanical form factor structure (not the actual connector but rather a dummy port/cage) that accommodates the mating connector from a cable in order to securely hold the cable in place during device replacement.

Thus, during device replacement, each cable removed from a port of the actual device can be plugged into the corresponding port on the replicated cable connection panel. Once the new device is installed, each cable can be moved from the port of the replicated cable connection panel to the proper port of the new device. Advantageously, individual cables do not have to be tagged to identify the ports from which they were disconnected as is needed to be done in the existing device replacement approach.

Figure 2:
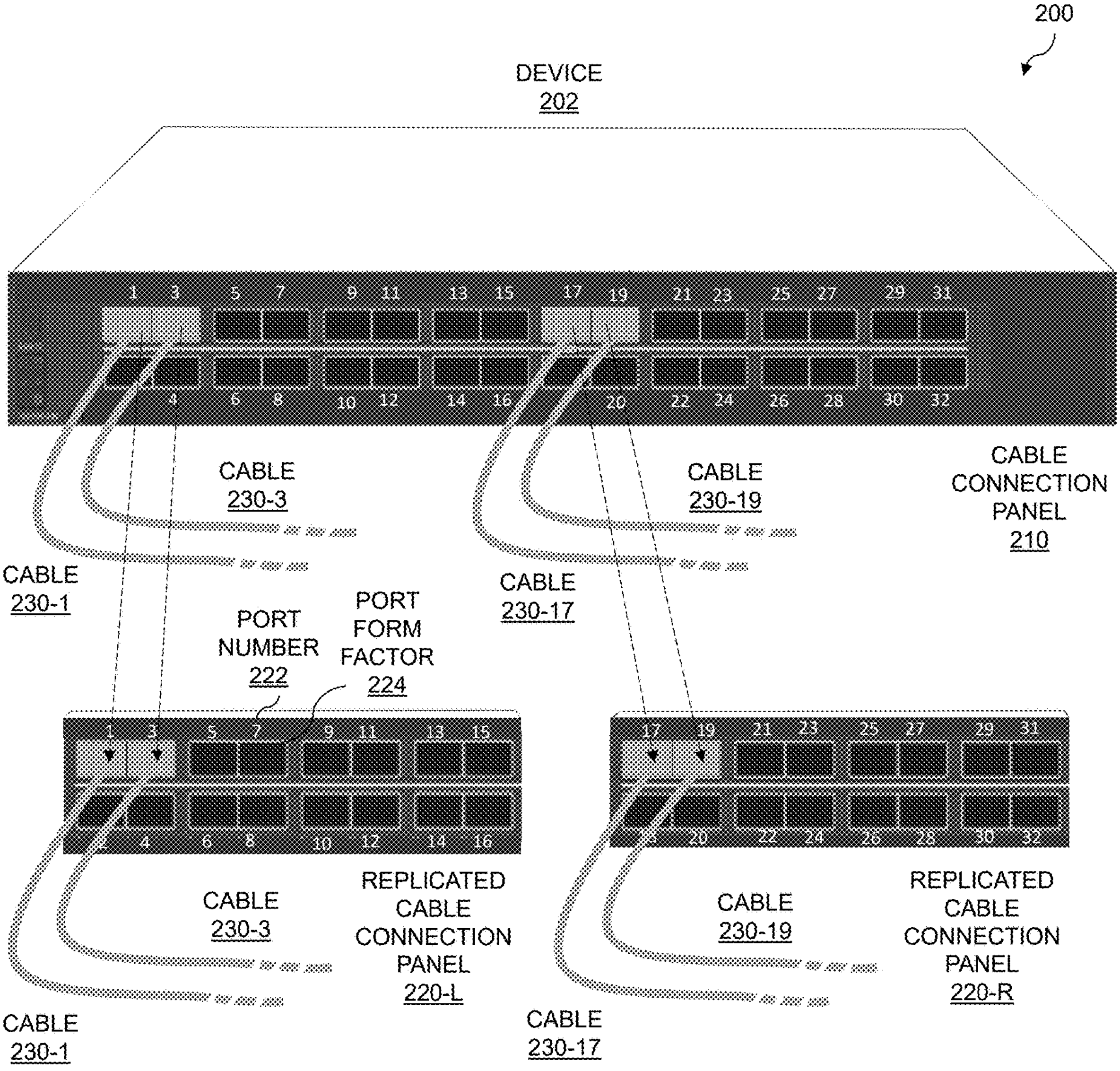
FIG. 2 illustrates a set of one or more replicated cable connection panels for use in managing cables connected to a device according to an illustrative embodiment.

FIG. 2 illustrates an exemplary use case 200 with a set of replicated cable connection panels for use in managing cables connected to a device according to an illustrative embodiment. As shown, assume device 202 is mounted in an equipment rack (not expressly shown) at a customer data center (i.e., in the field) and requires replacement. Device 202 comprises a cable connection panel 210 with a set of ports labeled 1 through 32, as shown. Further assume that at least some of the ports have cables connected thereto. In practical application, it is likely that most of the ports will have a cable connected thereto, thus making the existing tagging approach extremely tedious and fraught with potential error. To overcome these drawbacks, illustrative embodiments provide a set of replicated cable connection panels comprising a replicated cable connection panel 220-L (left-side) that replicates ports 1 through 16 on cable connection panel 210 of device 202, and a replicated cable connection panel 220-R (right-side) that replicates ports 17 through 32 on cable connection panel 210 of device 202. Note that on each of replicated cable connection panel 220-L and replicated cable connection panel 220-R, each port from cable connection panel 210 is replicated by providing the corresponding port number 222 and the port form factor 224 (i.e., actual connector or mechanical form factor structure to hold cable connector in place, as mentioned above) that matches the corresponding port (connector) on cable connection panel 210 of device 202. Each panel that comprises replicated cable connection panels 220-L and 220-R can be more generally considered a "panel structure," while each port form factor 224 on replicated cable connection panels 220-L and 220-R can be more generally considered a "connection structure." Thus, in some embodiments, a connection structure can be the actual connector that is the same as the connector on device 202, while in other embodiments it can be a dummy connector that simply matches the outer mechanical dimensions and mating structure of the actual connector such that it can hold the cable but does not necessarily include the electrical structure (e.g., pins, contacts, etc.) of the actual connector.

Thus, in operation, assume that ports 1, 3, 17, and 19 on cable connection panel 210 of device 202 have cables 230-1, 230-3, 230-17, and 230-19 respectively connected thereto (although, as mentioned above, it is likely that most of ports 1 through 32 will have cables connected thereto). A field engineer would then obtain the set of replicated cable connection panels comprising replicated cable connection panel 220-L that replicates ports 1 through 16 and replicated cable connection panel 220-R that replicates ports 17 through 32. In some embodiments, the set of replicated cable connection panels can be shipped with device 202 when it is originally deployed to the customer location so that replicated cable connection panel 220-L and replicated cable connection panel 220-R are available for use in managing cables whenever a device type of device 202 needs to be replaced. Otherwise, the field engineer can bring the set of replicated cable connection panels when going to the customer location.

Next, the field engineer removes power from device 202 and unplugs cable 230-1 from port 1 of cable connection panel 210 and plugs cable 230-1 into the corresponding port 1 on replicated cable connection panel 220-L (dashed line denotes the cable movement). Cable 230-3 is then unplugged from port 3 of cable connection panel 210 and plugged into the corresponding port 3 on replicated cable connection panel 220-L. Cables 230-17 and 230-19 are moved in a similar manner from cable connection panel 210 to respective corresponding ports on replicated cable connection panel 220-R. By moving one cable at a time from the port on device 202 to the corresponding port on the set of replicated cable connection panels 220-L and 220-R, the field engineer does not have to tag, label, or otherwise mark the cables.

Once all cables are moved from device 202 to the set of replicated cable connection panels 220-L and 220-R, the field engineer swaps out device 202 with a replacement device (not expressly shown). The field engineer then moves each cable back, port by port, from the set of replicated cable connection panels 220-L and 220-R to the cable connection panel of the replacement device (which matches device 202) adhering to the proper port numbers. Power can then be applied to the replacement device with the assurance that cables have been reconnected to the proper ports.

It is to be appreciated that while the set of replicated cable connection panels in FIG. 2 illustrates multiple replicated cable connection panels (220-L and 220-R), alternative embodiments can be implemented with a single replicated cable connection panel. In some use cases, multiple replicated cable connection panels may be preferred when subsets of cables connected to device 202 are coupled in separate harnesses on each side of the equipment rack and thus, for case of logistics, it is better to have separate replicated panels that can be located close to its respective harness of cables. Either replicated cable connection panel can be placed in an unused slot of the equipment rack or hanging in front of the equipment rack while the new device is being installed. Also, depending on the weight and/or size of the connectors, it may be better to have separate panels for panel stability or other reasons. Note that the dimensions (e.g., length, width, thickness) of each replicated cable connection panel are dependent on the device being replicated and/or the port types and layout and thus embodiments are not limited to any particular dimensions. For example, panel thickness may be chosen based on the thickness of the ports mounted thereon and for mechanical stability.

Further, advantageously, in some embodiments, the set of one or more replicated cable connection panels comes with the exact port/cage type (without connectors) to allow passive fibers/copper cables with attached transceiver modules to be inserted into the dummy ports. The replicated cable connection panels keep every module neatly separated and hold each one down tightly in the port/cage to prevent damage and tangling of cables and modules. Also, the replicated cable connection panels are re-usable, i.e., a single set of one or more replicated cable connection panels can be used in large data center for every device type for which the set is designed to replicate.

Accordingly, while existing approaches require the technician to mark or tag individual cables prior to removal and reconnect them during switch replacement, a replicated cable connection panel kit according to illustrative embodiments helps to avoid marking or tagging and requires only the removal and reconnection of each cable in the appropriate port. This provides for a hassle-free approach with reconnection of all cables without a mismatch. As such, illustrative embodiments provide confidence that no connections are missed or wrong port(s) mapped. Illustrative embodiments also save time and personnel power.

By way of one non-limiting example only, device 202 may be a network switch such as, but not limited to, a Dell PowerSwitch S5232F-ON or a Dell PowerSwitch N3248TE-ON. However, it is to be understood that embodiments are not limited to any particular type of device.

Figure 3:
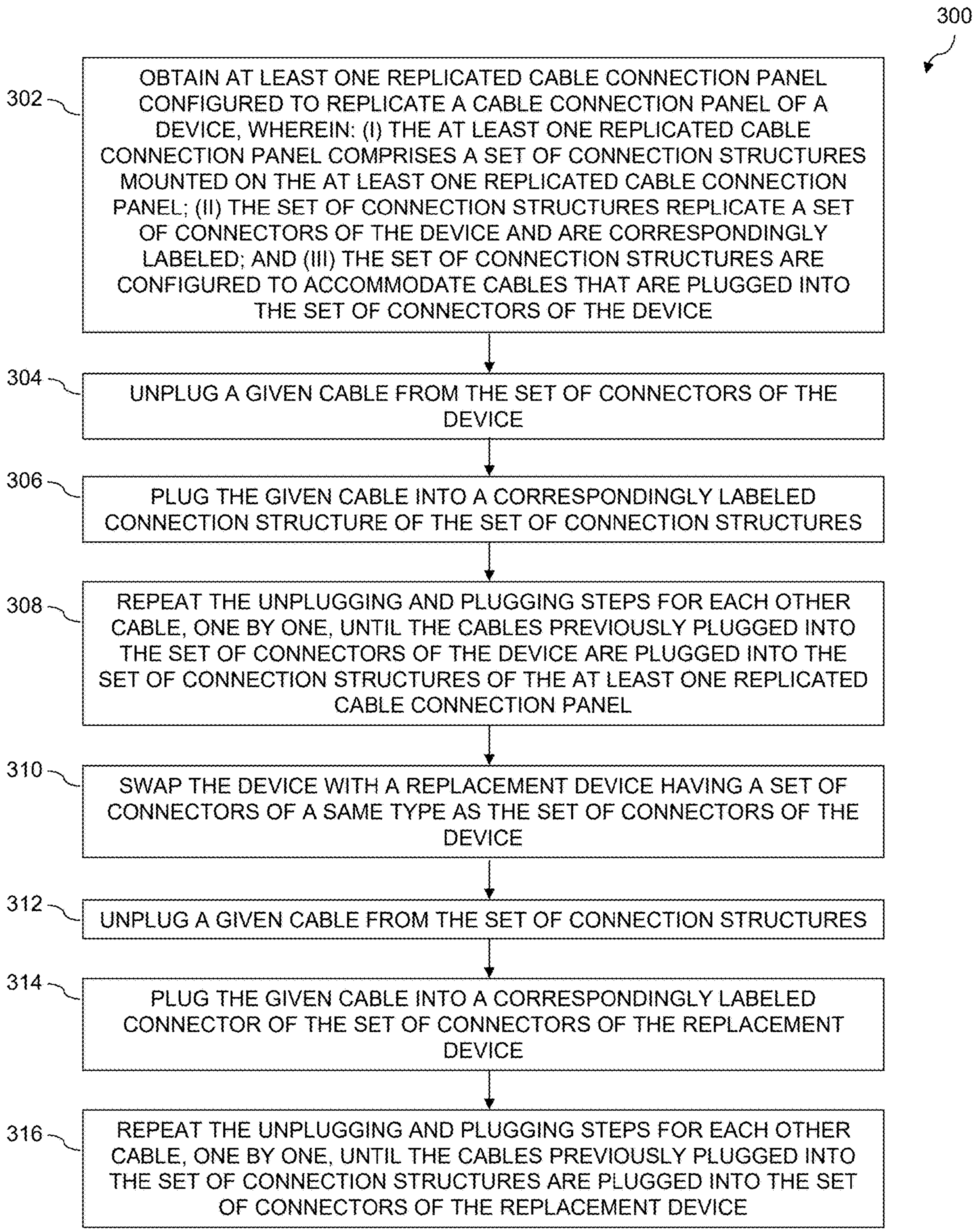
FIG. 3 illustrates a methodology for utilizing a set of one or more replicated cable connection panels to manage cables connected to a device according to an illustrative embodiment.

FIG. 3 illustrates a methodology 300 for utilizing a set of one or more replicated cable connection panels to manage cables connected to a device according to an illustrative embodiment. In some embodiments, the steps can be performed by a field engineer, a technician, a customer, or one or more other persons.

As shown, in step 302, at least one replicated cable connection panel configured to replicate a cable connection panel of a device is obtained. The at least one replicated cable connection panel comprises a set of connection structures mounted on the at least one replicated cable connection panel. The set of connection structures replicate a set of connectors of the device and are correspondingly labeled. The set of connection structures are configured to accommodate cables that are plugged into the set of connectors of the device.

In step 304, a given cable from the set of connectors of the device is unplugged.

In step 306, the given cable is plugged into a correspondingly labeled connection structure of the set of connection structures.

In step 308, the unplugging and plugging steps are repeated for each other cable, one by one, until the cables previously plugged into the set of connectors of the device are plugged into the set of connection structures of the at least one replicated cable connection panel.

In step 310, the device is swapped with a replacement device having a set of connectors of a same type as the set of connectors of the device.

In step 312, a given cable from the set of connection structures is unplugged.

In step 314, the given cable is plugged into a correspondingly labeled connector of the set of connectors of the replacement device.

In step 316, the unplugging and plugging steps are repeated for each other cable, one by one, until the cables previously plugged into the set of connection structures are plugged into the set of connectors of the replacement device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments. Also, in alternative embodiments, the ordering of steps can be modified to accommodate the device replacement process as needed/desired.

It should again be emphasized that the above-described embodiments are presented for purposes of illustration only. Many variations and other alternative embodiments may be used. For example, the disclosed techniques are applicable to a wide variety of other types of information processing systems, cables, flexible displays, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus, comprising:

at least one replicated cable connection panel structure configured to replicate a cable connection panel of a device, wherein the replicating comprises, at least partially, visually and mechanically imitating the cable connection panel of the device without one or more electrical functionalities or one or more optical functionalities of the cable connection panel of the device; and a set of connection structures mounted on the at least one replicated cable connection panel structure, wherein the set of connection structures replicate imitate a mechanical form factor of a set of connectors of the device, wherein each of the set of connection structures is configured to physically hold a cable that is pluggable into a corresponding one of the set of connectors of the device.

2. The apparatus of claim 1, wherein at least a portion of the set of connection structures comprises a set of structures that each match a mechanical dimension of a corresponding one of the set of connectors of the device.

3. The apparatus of claim 1, wherein at least a portion of the set of connection structures comprises a set of structures that each match a mating structure of a corresponding one of the set of connectors of the device.

4. The apparatus of claim 1, wherein the set of connection structures comprise a set of connectors that match the set of connectors of the device.

5. The apparatus of claim 1, wherein each of the set of connection structures mounted on the at least one replicated cable connection panel structure comprises a label to match a label of a corresponding one of the set of connectors of the device.

6. The apparatus of claim 1, wherein the at least one replicated cable connection panel structure comprises a first panel structure and a second panel structure separate from the first panel structure, wherein a first subset of the set of connection structures mounted on the first panel structure replicate a first subset of the set of connectors of the device, and a second subset of the set of connection structures mounted on the second panel structure replicate a second subset of the set of connectors of the device.

7. An apparatus, comprising:

a set of replicated cable connection panel structures configured to replicate a cable connection panel of a device, wherein the replicating comprises, at least partially, visually and mechanically imitating the cable connection panel of the device without one or more electrical functionalities or one or more optical functionalities of the cable connection panel of the device;

a first set of connection structures mounted on a first one of the set of replicated cable connection panel structures configured to imitate a mechanical form factor of a first subset of a set of connectors of the device; and a second set of connection structures mounted on a second one of the set of replicated cable connection panel structures configured to imitate a mechanical form factor of a second subset of the set of connectors of the device.

8. The apparatus of claim 7, wherein at least a portion of the first set and the second set of connection structures comprises a set of structures that each match a mechanical dimension of a corresponding one of the set of connectors of the device.

9. The apparatus of claim 7, wherein at least a portion of the first set and the second set of connection structures comprises a set of structures that each match a mating structure of a corresponding one of the set of connectors of the device.

10. The apparatus of claim 7, wherein the first set and the second set of connection structures comprise a set of connectors that match the set of connectors of the device.

11. The apparatus of claim 7, wherein each of the first set and the second set of connection structures comprises a label to match a label of a corresponding one of the set of connectors of the device.

12. A method, comprising:

obtaining at least one replicated cable connection panel configured to replicate a cable connection panel of a device, wherein the replicating comprises, at least partially, visually and mechanically imitating the cable connection panel of the device without one or more electrical functionalities or one or more optical functionalities of the cable connection panel of the device, and wherein: (i) the at least one replicated cable connection panel comprises a set of connection structures mounted on the at least one replicated cable connection panel; (ii) the set of connection structures replicate a set of connectors of the device and are correspondingly labeled; and (iii) the set of connection structures are configured to accommodate cables that are plugged into the set of connectors of the device;

unplugging a given cable from the set of connectors of the device;

plugging the given cable into a correspondingly labeled connection structure of the set of connection structures; and repeating the unplugging and plugging steps for each cable, one by one, until the cables previously plugged into the set of connectors of the device are plugged into the set of connection structures of the at least one replicated cable connection panel.

13. The method of claim 12, further comprising swapping the device with a replacement device having a set of connectors of a same type as the set of connectors of the device.

14. The method of claim 13, further comprising:

unplugging a given cable from the set of connection structures;

plugging the given cable into a correspondingly labeled connector of the set of connectors of the replacement device; and repeating the unplugging and plugging steps for each cable, one by one, until the cables previously plugged into the set of connection structures are plugged into the set of connectors of the replacement device.

15. The method of claim 14, wherein the swapping, unplugging, and plugging steps are performed in an operational environment.

16. The method of claim 12, wherein at least a portion of the set of connection structures comprises a set of structures that each match a mechanical dimension of a corresponding one of the set of connectors of the device.

17. The method of claim 12, wherein at least a portion of the set of connection structures comprises a set of structures that each match a mating structure of a corresponding one of the set of connectors of the device.

18. The method of claim 12, wherein the set of connection structures comprise a set of connectors that match the set of connectors of the device.

19. The method of claim 12, wherein each of the set of connection structures mounted on the at least one replicated cable connection panel comprises a label to match a label of a corresponding one of the set of connectors of the device.

20. The method of claim 12, wherein the at least one replicated cable connection panel comprises a first panel structure and a second panel structure separate from the first panel structure, wherein a first subset of the set of connection structures mounted on the first panel structure replicate a first subset of the set of connectors of the device, and a second subset of the set of connection structures mounted on the second panel structure replicate a second subset of the set of connectors of the device.

* * * * *